US012731973B2

(12) United States Patent
Hermey et al.

(10) Patent No.: US 12,731,973 B2
(45) Date of Patent: Sep. 8, 2026

(54) SYSTEMS FOR MONITORING THE OPERATION OF AN ENERGY CHAIN

(71) Applicant: igus GmbH, Cologne (DE)

(72) Inventors: Andreas Hermey, Hennef (DE); Thilo-Alexander Jaeker, Sankt Augustin (DE); Dominik Barten, Meckenheim (DE); Richard Habering, Cologne (DE); Konstantin Schmer, Cologne (DE)

(73) Assignee: igus GmbH, Cologne (DE)

( * ) Notice: Subject to any disclaimer, the term of this patent is extended or adjusted under 35 U.S.C. 154(b) by 222 days.

(21) Appl. No.: 18/501,085

(22) Filed: Nov. 3, 2023

(65) Prior Publication Data

US 2024/0063624 A1 Feb. 22, 2024

Related U.S. Application Data

(63) Continuation of application No. 16/472,588, filed as application No. PCT/EP2017/084570 on Dec. 22, 2017, now Pat. No. 11,824,333.

(30) Foreign Application Priority Data

Dec. 23, 2016 (DE) ..................... 20 2016 107 317.0

(51) Int. Cl.

*H02G 11/00* (2006.01)
*F16G 13/16* (2006.01)
*F16G 13/18* (2006.01)

(52) U.S. Cl.

CPC ........... *H02G 11/006* (2013.01); *F16G 13/16* (2013.01); *F16G 13/18* (2013.01)

(58) Field of Classification Search

CPC ......... H02G 11/006; F16G 13/16; B22F 7/08; B22F 12/90

See application file for complete search history.

(56) References Cited

U.S. PATENT DOCUMENTS 5,917,433 A * 6/1999 Keillor ..................... G08G 1/20 340/7.37
9,920,815 B2 * 3/2018 Jaeker ..................... G01L 5/106
(Continued)

FOREIGN PATENT DOCUMENTS

DE 202004005858 * 6/2004

*Primary Examiner* — Nkeisha Smith
(74) *Attorney, Agent, or Firm* — Secant IP, PLLC

(57) ABSTRACT

Monitoring systems for energy chains which guide lines, and which are displaceable along a displacement path and thereby form a movable strand, a stationary strand, and a deflection arc therebetween. According to a first aspect, one or multiple sensors are arranged stationary and form a detection path along the displacement path of the energy chain, in order to react to an approaching and/or contact of the energy chain. According to a second aspect, a plurality of sensor modules are distributed along the energy chain. In this case, each sensor module has a measurand detector and a communication unit for transmitting outputs to an evaluation unit. The first and the second aspect allow function monitoring, for example for the purpose of a safety shutdown. According to a third aspect, a sensor module is arranged on the driver-side end region. The module has a sensor for the quantitative detection of a kinematic parameter of the end region, as well as a communication unit for transmitting output data depending on detected kinematic parameters. This allows an application-dependent prediction of the remaining service life of energy chains.

17 Claims, 4 Drawing Sheets

(56) References Cited

U.S. PATENT DOCUMENTS

| | | | | |
|---|---|---|---|---|
| 11,143,270 | B2 * | 10/2021 | Hermey | F16L 3/015 |
| 11,333,563 | B2 * | 5/2022 | Habering | G01R 31/2841 |
| 11,698,313 | B2 * | 7/2023 | Krista | H02G 11/006 59/78.1 |
| 11,824,333 | B2 * | 11/2023 | Hermey | F16G 13/18 |
| 2015/0122047 | A1 * | 5/2015 | Riddall | G01N 3/08 73/828 |
| 2024/0192260 | A1 * | 6/2024 | Habering | H04B 3/60 |

* cited by examiner

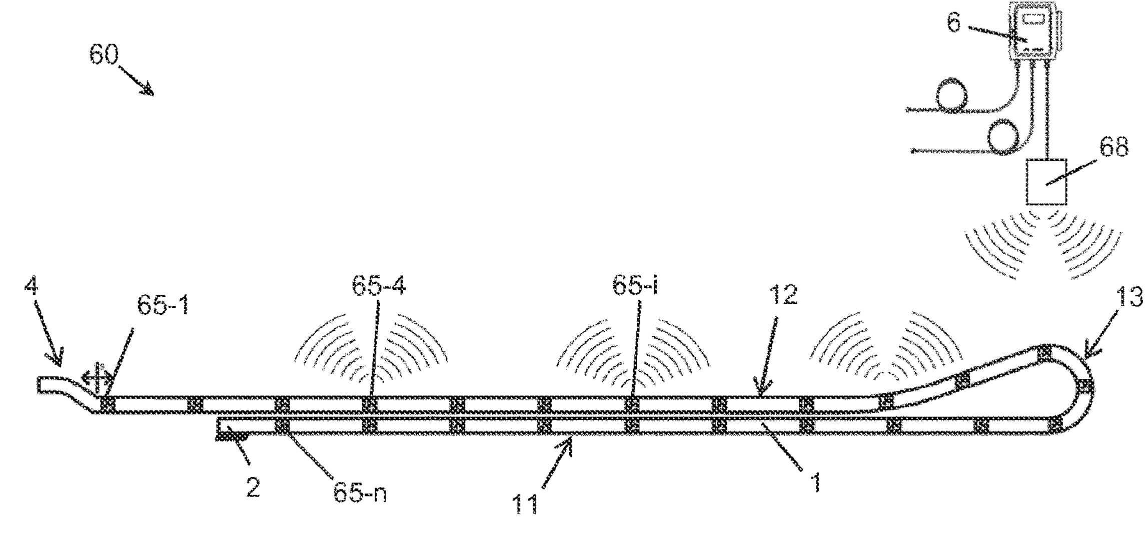
FIG.6A
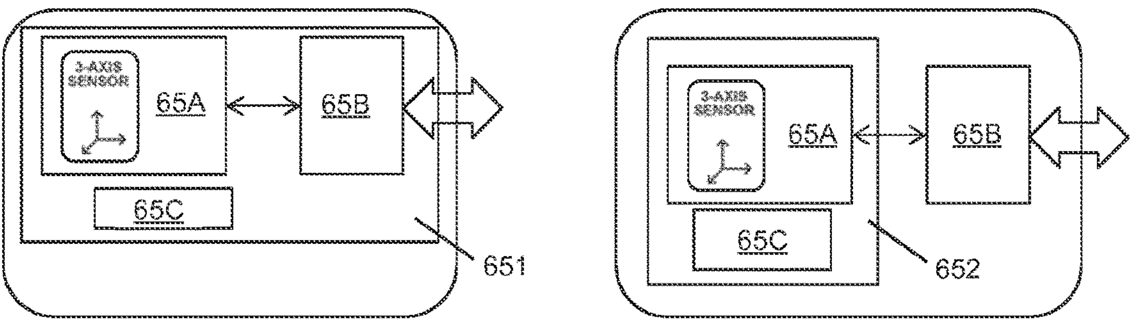
FIG.6B
FIG.6C
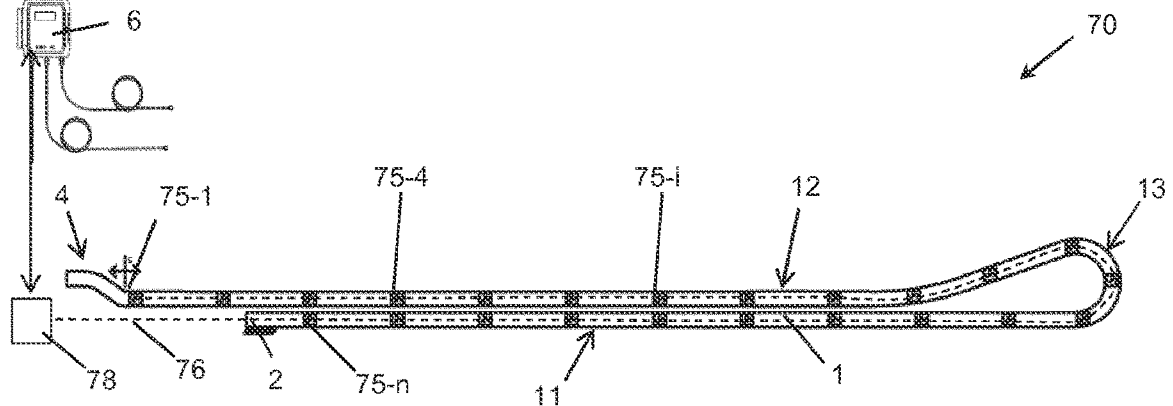
FIG.7

SYSTEMS FOR MONITORING THE OPERATION OF AN ENERGY CHAIN

CROSS-REFERENCE TO RELATED APPLICATIONS

The present application is a continuation of U.S. non-provisional application Ser. No. 16/472,588, filed Jun. 21, 2021, currently pending, which is a U.S. national stage (371) application of PCT application serial no. PCT/EP2017/084570, filed Dec. 22, 2017, which claims priority to German patent application serial no. 202016107317.0, filed Dec. 23, 2016, which are all incorporated by reference herein.

FIELD

The invention generally relates to the monitoring of the operation of at least one energy chain, or of a similar active or dynamic line guide device.

BACKGROUND

Energy chains are used to guide at least one supply line between a base, or a fixed point, and a driver relatively moveable thereto. Typically, they here form a moveable strand, a stationary strand and a deflection arc located therebetween, wherein the deflection arc moves at half the speed of the driver. Typically, the energy chain guides multiple supply lines, such as cables for electrical power and/or signal supply, and hoses for supplying with liquid or gaseous operating fluids.

In normal operation, or in the intended operation of the energy chain, the moveable strand is pulled or pushed in the displacement direction by the driver. The chain causes a force opposing the movement due to friction and inertia, and in part may be subjected to considerable tensile or pressure forces, depending upon the length and weight.

Error conditions can occur during operation, especially due to pressure forces, above all in energy chains with high speeds and/or long displacement paths. The normal operation of the energy chain can be disrupted due to wear, but also for reasons of an external error or defect, for example a control error that leads to the exceeding of the maximum displacement path, or an interfering object or obstacle. Error conditions of the chain can result in such manner of cases, e.g. a breaking-away of the moveable strand in the push direction ahead of the deflection arc, an arc course deviating from the proper course, a striking out of guide, etc., up to a rupturing of the chain.

Against this background, the invention in particular relates to a monitoring system for the recognition of such error conditions at an early stage, wherein the system is equipped with at least one sensor, which generates at least one output that is dependent on the state of the energy chain, and with an evaluation unit. The evaluation unit evaluates the output of the sensor in order to monitor if a critical state occurs in the operation of the energy chain, in particular before the energy supply chain, with the lines guided therein, is damaged.

Such a system is already known from WO 2004/090375 A1 and has been successfully launched onto the market by the applicant. Here, which forces act on the energy chain is detected by one or multiple sensors, configured as force sensors. The evaluation unit compares the detected forces with a predetermined tolerance range in order to recognize whether a malfunction occurs.

A further development of the force sensor is proposed in WO 2013/156607 A1. Here, this document proposes to arrange multiple force transducers as sensors in force transmission between the driver and the corresponding connection point or end attachment parts of the energy chain, for reliable measurement. The force transducers measure the force exerted on the energy chain at this end side, which force is monitored as a state-dependent parameter.

WO 2009/095470 A1 or EP 2 235 396 A1 likewise disclose a force measurement for the purpose of a safety shutdown. Here, the energy chain is disconnected from the supplied plant, machine or the like depending on the forces acting.

These already known approaches monitor whether impermissibly high forces occur, in order to, if necessary, intervene before a damaging, in particular before a rupturing of the energy chain. Many malfunctions can be recognized at an early stage based upon a force measurement, i.e. a metrologically quantitative parameter detection.

WO 2009/095470 A1 further proposes (see page 11) to provide a number of contact means along the displacement path, which can come into contact with the energy chain. These contact means generate a signal, the evaluation of which signal can cause a change in operation, in particular the above-mentioned disconnection of the energy chain from the machine.

A reliable statement about the current position of the energy chain, in particular as to whether the energy chain in totality exhibits a normal course, does not permit itself to be made, however, by the previously-known systems.

A further approach, which is not based upon an actual measurement in the sense of measurement technology, has been proposed by the applicant in the utility model DE 20 2004 005 858 U1. In this case, upon a selection of a few chain links of the energy chain, a simple, switch-like sensor is arranged respectively at or in the chain link, with which sensor a pivoting of the chain link beyond a certain angular range can be registered. For this purpose, e.g. a gravity switch, embodied as a mercury switch, can be provided, which detects the spatial orientation of the respective chain link. Based on a plurality of such manner of sensors in the energy chain, the current position can only relatively roughly be monitored, in particular as to whether the deflection arc exhibits a nominal course. This solution is also elaborate, since considerable cabling effort goes along with the number of additional devices on or in the energy chain.

Furthermore, non-generic systems that only recognize an already occurred chain rupture, are also known. However, this does not allow early recognition, e.g. for the preventive maintenance, and does not prevent an undesired malfunction.

SUMMARY

It is therefore a first object of the present invention to propose a simple, in particular connected with little production effort, but nonetheless robust solution for monitoring the operation of an energy chain. Here, the system should also allow an early detection of error conditions.

An independent second object of the invention is therefore to propose a monitoring system, which makes a more precise statement about the current state of the energy chain possible, in particular on the course, without herewith involving a significantly increased cabling effort.

A third independent object of the invention consists in proposing a system that allows a statement about the service life, in particular the remaining service life of the energy chain, for example for the purpose of a preventive maintenance.

The energy chain is generally an active, dynamic line guide device for the guiding of at least one line between a first connection point for the connection to a base, and a second connection point, which is relatively moveable the first connection point, for the connection to a driver (also called entrainment member). Typically, the base is stationary, and the driver is relatively-moveable, e.g. arranged on a moveable part of a machine or plant to be supplied. The energy chain is displaceable along a displacement path and here, in a manner known per se, includes a moveable strand, a stationary strand and a deflection arc therebetween connecting both strands. Typically, the movement of the energy chain takes place in one plane. However, courses with lateral movement or three-dimensional movement, e.g. in robots, are also in the scope of the invention.

The generic monitoring system includes an arbitrary energy chain, as well as at least one sensor in general, or specifically at least one measurand detector, which generates at least one output dependent upon the condition of the energy chain. Furthermore, the generic system evaluates this at least one output, preferably based on a separate evaluation unit. The term "output" is here to be generally understood in the sense of information. This information is typically transmitted by one or multiple electric signals, digital or analog, to be evaluated. An evaluation unit which is spatially integrated in or on a sensor, or in or on a sensor module, with the measurand detector, lies within the scope of the invention.

An evaluation unit can process status values generated as an output at the respective output. The evaluation unit can compare a set of status values as a whole with an expected set. The evaluation unit can also compare e.g. each value individually with a predetermined target value or tolerance range or tolerance field. The evaluation unit processes the outputs in any case, in order to recognize, at an early stage, whether an error status, e.g. an undesired position or incorrect course occurs in the operation of the energy chain. In the event of a discrepancy determined to be critical, the evaluation unit can output a signal to stop the moved machine part with which the driver is connected, in order to avert a rupture of the energy chain. Here, the processing can in particular rest on target values and comparative values that have been pre-specified in a teach-in mode of the evaluation unit. E.g., this occurs in that the normal operation is run through step by step, and the evaluation unit records the operating parameters, to be seen as normal or reference values, required for the evaluation.

First Aspect of the Invention

According to a first aspect of the invention, the first previously-mentioned object is already achieved in that the at least one or the multiple sensors are arranged in a stationary manner and form a detection path, which substantially extends along the displacement path of the energy chain. The detection path extends here over a sub-section of the displacement path, or over the entire fault-prone portion of the same. The detection path can extend in particular parallel to, directly at the displacement path and/or spatially neighboring this path. The sensor or the multiple sensors are arranged fixed in location or in a stationary manner and can, as a result, detect the deviation of the chain from the normal displacement path, the displacement path in fault-free normal operation, without themselves being displaced with the moveable energy chain.

According to the invention, the at least one or the multiple stationary sensors can react respectively to an approaching of the energy chain to the sensor and/or a contacting of the sensor by the energy chain. In other words, the respective sensor is configured such that it is in a position to recognize or detect the presence of the energy chain in its direct vicinity. The sensor(s) could detect, e.g. mechanically, a contact with the energy chain. However, to avoid wear, sensors that contactlessly register the presence of the energy chain in a predefined area, dependent on the range of the sensor, are particularly preferred. The sensor or the sensors can be arranged such that they interact with the chain in normal operation, and/or such that they interact with the chain in the error condition.

The monitoring system according to the invention provides a plurality of possibilities for implementation and a number of advantages compared to known monitoring systems. For one, the system is particularly robust, i.e. little prone to fault, since the detection system itself does not have to contain moveable parts—except for the energy chain. Thusly—instead of being arranged directly on or in the longitudinal sections or chain links potentially prone to error conditions—one or multiple stationary sensors can be arranged separated from the energy chain itself, and nevertheless serve to monitor the critical areas. As a result, the sensors themselves are inherently protected from effects of error conditions.

Unlike with systems known from the prior art, the sensor of the first aspect of the invention can thusly be arranged outside, or externally, of the chain. Thusly, no change, or at most a very slight change in the construction of the energy chain itself is required.

The detection path can be formed by one or multiple trigger elements, sensing elements, or the like, which interact with a single sensor, which converts a mechanical actuation to a signal, for example.

Particularly preferably, the monitoring system according to the invention, according to a first aspect, includes a plurality of individual sensors, which are distributed stationarily along the displacement path, in order to form the detection path based on the distribution, preferably in parallel to the displacement direction. Hereby, the system can inherently detect a status information relating to the current position of the energy chain relative to the detection path. The desired accuracy of the detection of the position of the energy chain can be adapted through the selected number of sensors, or through the distance of individual sensors from one another. Embodiments having multiple locally-discretely-arranged sensors are particularly robust, since the failure of an individual sensor can influence the general detection reliability only slightly, and does not have to lead to a system failure in any case. The term plurality is here to be particularly understood as sufficiently large number, so that always at least one sensor interacts with the displacing deflection arc at least in the fault-prone longitudinal section of the energy chain.

Proven switches, known to the person skilled in the art, which moreover generate value-discrete output signals, can be employed as a sensor. This simplifies the computing efforts in the evaluation unit.

Preferably, such sensors which interact with the energy chain in a contactless manner are in particular contactless proximity switches. Particularly preferably, optical proximity switches, preferably light sensors, are used for this purpose, i.e. optical sensors in which the optical transmitter and receiver is integrated in one unit and preferably no reflector is needed. One-way light barriers with separate receiver, or reflection light barriers with additional reflector, can be used as optical proximity switches. A preferred alternative are capacitive hereto are proximity switches that can interact with the energy chain in a contactless manner. Possibly connected with changes to the construction of the energy chain, but technically also possible are also other contactless proximity switches, such as inductive proximity switches, reed switch contacts, Hall effect sensors, or the like. Contactless embodiments have an especially long service life, because they are free of wear and can be used flexibly with energy chains of various model series, e.g. independently of the construction and size connected to the specific chain.

In a preferred embodiment of the monitoring system, the sensors are arranged at a height above the nominal course of the moveable strand, laterally to the energy chain. In this embodiment, each sensor can recognize an exceeding of a height, predefined as a threshold value, as an error condition of the chain. One advantage of this embodiment is that it can applicable for self-supported energy chains as well as sliding energy chains. This embodiment can be integrated in a guide trough and generates little additional effort during the production.

Furthermore, the sensors can be arranged at the height of the nominal course of the moveable strand, laterally to the energy chain. In this case, the sensors register a contact with or an approach of the energy chain in normal operation, and a approach that fails to occur or an absence means an error condition. Alternatively, the sensors can be arranged at the height of the nominal course of the stationary strand, laterally to the energy chain, which can be evaluated together with an information about the current position or velocity of the driver. The position of the stationary strand per se can also be detected with sensors which are arranged opposite the stationary strand, i.e. facing the narrow sides of the link plates or the cross-webs. In this embodiment, the sensors interact with the energy chain in normal operation as well as in the error condition, e.g. to detect the position or displacement velocity of the deflection arc in an approximating manner. This position can be directly compared with a target position, which depends, for example, on a known current position of the driver. The speed of the deflection arc, e.g. in normal operation, is to be half the speed of the driver, and is typically lower in an error condition. Just as well, the above-mentioned embodiments can retrospectively easily be installed into a guide trough, or be manufactured together therewith.

Particularly preferably, the sensors interact with the deflection arc one after the other as the deflection arc travels through the detection path. Thus, the current position of the deflection arc can at least roughly be determined in a simple manner, and be compared with a target position, or its speed can be determined in an approximate manner. This effect can be achieved in self-supported energy chains, if the sensors are arranged at a height between the nominal course of the moveable strand and the nominal course of the stationary strand. In sliding energy chains, a detection path at the height of the nominal course of the moveable strand is also possible.

Preferably, the sensors are arranged at regular intervals, wherein the minimum amount of the distance is the link separator (in the longitudinal direction) in the case of a link chain, or in any case the construction height (in the transverse plane) of the energy chain. As a maximum amount, the distance should be smaller than or equal to the predetermined deflection arc radius, i.e. the radius that is not to be undercut by the deflection arc. Thus, a faulty course can be reliably detected at all times, since the energy chain can not move unrecognized through the free space between two neighboring sensors. In many cases, however, a distance that corresponds to a multiple of the radius, e.g. 4 or 6 times the radius, is sufficient.

The sensors can be attached on or in a guide trough, in which the energy chain is laterally guide. The advantage is that the sensors can be manufactured and delivered together with the guide trough, which reduces the on-site installation work. To further reduce efforts, sensors that need to be arranged at only one side of the energy chain or guide trough to react to an approach and/or contact of the energy chain, are preferred.

The evaluation unit can continuously evaluate the outputs of the sensors in operation. The continuous evaluation can occur time-discretely at a sufficient frequency, or time-continuously. The evaluation unit can comprise a storage, in which nominal reference sensor outputs, through a teach-in process, can be stored or are prestored, in order to continuously compare, in operation, the outputs of the sensors with the prestored nominal reference sensor outputs. The reference sensor outputs can be generated through a reference run of the chain when commissioning the chain, or be generated through a computer model ex works. Thus, the evaluation unit can compare, in particular compare with a nominal sequence predetermined for each travel direction, in order to monitor whether an error condition occurs. The nominal sequence can be determined and set for nominal operation in a teach-in mode when commissioning the monitoring system. A simple principle with the detection of the position of the deflection arc e.g. only requires that always the directly-neighboring sensor triggers as the next one in the sequence. If an unexpected sensor is triggered, an error condition can be concluded.

In a plurality of sensors, each of the sensors can, for communication, be connected with the evaluation unit, or one or multiple interposed bus interface modules, bus couplers, or the like, via a fieldbus, preferably a linear bus topology (serially) and in particular in two-wire technology, such as ASI bus, CAN bus, or the like. Other types of buses, e.g. in accordance with the IEC 61158 standard, such as Interbus or Profibus, can also be considered. In particular in serial two-wire technology, cabling efforts are kept as low as possible. The stationary sensors are preferably supplied with electric energy via the bus. A wireless interface, e.g. Wi-Fi, via which the sensors communicate with the evaluation unit, is also conceivable. The wireless variant can largely simplify the installation of the monitoring system on-site.

The sensors preferably can be distributed along one side of the energy chain only, or on both sides, e.g. in an alternating manner.

In an alternative embodiment that includes only one, or only a few sensors, the sensor comprises an elongate triggering element, in particular a trigger cord, that forms the detection path above the nominal course of the moveable strand opposite this strand, and that triggers upon a contact of the triggering element by the energy chain.

In this case, the sensor reacts to a contact by the chain that can only occur in a faulty course of the chain. This is an especially cost-efficient embodiment, because only one sensor is required, and a specific evaluation is not necessary. However, only the exceeding of a certain threshold value can be detected in this case.

Second Aspect of the Invention

According to a second aspect of the invention, the second above-mentioned object is readily achieved in that a plurality of sensor modules are not attached stationary, but distributed along the length of the energy chain on or in this chain. In this way, the sensor modules can respectively react to a local status change of the energy chain, in particular directly in the region of the fastening point, even though this relates to only a locally-restricted sub-section of the energy chain.

The advantage of sensors of modular design, i.e. exchangeable closed functional units with distinct measurand detector, lies with the reduction of costs even for a high number of sensor units in the energy chain on the one hand, and a design that fits to a plurality of existing chain type series, possibly also for retrofitting purposes. As used herein, the term "plurality" relates in particular to a sufficiently large number, which is selected in such a way that at least one sensor module lies in the displaceable deflection arc at all times at least in the fault-prone longitudinal portion of the energy chain. Thus, a sensor module can be attached to every n-th chain link provided that the deflection arc does not include more than a number of n chain links.

The sensor modules are preferably configured in such a compact manner that they can be installed in the receptacle space for lines within the energy chain, and occupy only a small part of the space, e.g. <<10%. Sensor modules that are received, e.g. snapped, in recesses on the link plates are also conceivable.

According to the second aspect of the invention, each sensor module comprises, in accordance with the invention, a communication unit that serves to transmit outputs to the evaluation unit, wherein the outputs depend on the parameter that were metrologically measured. A distinct communication unit can be directly provided in each sensor module, or multiple sensor modules share a common communication unit in or on the energy chain. By a suitable selection of the technology of the communication unit, the production and installation efforts can be kept at a manageable level even for a relatively high number of sensor modules. In addition, most various output values can be transmitted using suitable, uniform communication protocols, likewise also various quantitative measurands on the condition of the energy chain.

The communication unit here can be configured for wireless data communication via radio communication, or for wired data communication via a data bus. Radio communication largely minimizes the cabling efforts. If, however, a wired power supply of the sensor modules is desired nonetheless, a wired data bus, in particular a fieldbus for industrial automation, can be used just as well. In both cases, the sensor modules preferably communicate via a communication protocol with error correction regarding the data transmission. In this way, the communication unit inherently makes it possible to reliably transmit or monitor, even at strong electromagnetic interference fields.

The measurand detector can detect a measurand quantitatively, i.e. measure this measurand by measurement techniques.

In particular for this purpose, a preferred embodiment provides that each sensor module has at least one integrated circuit that comprises the measurand detector. Most diverse types of sensors have already been available in the form of integrated circuits, in particular in semiconductor technology, at a low price. As a result, particularly small construction sizes of the modules are made possible.

A sensor module with integrated circuit may comprise, as a measurand detector, preferably at least:

- an acceleration sensor, in particular a 3-axis acceleration sensor, for the quantitative detection of a kinematic quantity, in particular acceleration, speed and/or position;
- a position sensor, e.g. a MEMS rotation rate sensor, for the quantitative detection of the spatial orientation; and/or
- a height sensor, for the quantitative detection of an absolute height in space;

and respectively transmit corresponding outputs to the evaluation unit. Kinematic parameters, spatial position and/or absolute height of the distributed sensor modules, individually or in combination of at least two of these quantities, respectively allow a relatively precise statement about the current operating state of the energy chain, an in particular a reliable monitoring as to whether this state lies within predetermined nominal parameters. Particularly acceleration sensors allow determining, in a relatively precise manner, whether the energy chain exhibits the desired nominal behavior, and also allow recognizing a critical deviation at an early stage, in order to avoid a rupture or standstill.

As an alternative to more complex sensor modules with digital IC, it is also conceivable that the sensor modules comprise a proven analog position sensor, e.g. a potentiometer or the like, as the measurand detector, in particular to detect the relative pivot angle between two neighboring chain links of the energy chain in a quantitative manner, and transmit corresponding quantitative outputs to the evaluation unit. Thus, it can be easily recognized, for example, whether an undesired curvature develops in a partial section that is currently not located in the deflection arc.

For energy supply, each sensor module preferably has an energy storage, in particular a distinct energy storage. Thus, e.g. a wired power supply can be completely dispensed with. The cabling efforts are also reduced if each sensor module comprises a circuit for contactless inductive energy transmission, in particular with a receiving coil for near field coupling. In addition, retrofitting or exchanging of the energy chain is simplified thereby. Thus, e.g. all sensor modules can be supplied by means of the same supply line, without that a respectively individual contacting needs to be conducted.

To avoid additional cables in the energy chain, it is advantageous when the communication unit is configured for wireless communication, in particular via Wi-Fi according to IEEE 802.11, and the evaluation unit comprises a corresponding radio or Wi-Fi interface, or is connected with a radio or Wi-Fi interface module.

Alternatively, the communication unit can be configured for wired communication via a fieldbus with linear topology, in particular in two-wire technology, such as ASI bus, CAN bus or the like. The evaluation unit should than comprise a corresponding bus interface, or be connected with a bus interface module.

Even in an industrial fieldbus with linear topology, the cabling efforts are reduced, since all sensor modules can be connected to a common bus line.

In a preferred embodiment, the communication unit is implemented in the form of an integrated circuit, in particular as an integral part of the sensor module, preferably in the same circuit that comprises the measurand detector, or as a separate integrated circuit connected to the latter, i.e. it is possible to also use separate ICs, e.g. connected via I2C, in each sensor module.

For easy attachment of the sensor modules without changing the construction of the energy chain, each sensor module can be integrated in a cross-web, which is releasably attached in a chain link of the energy chain, or in a separation web releasably attached to a chain link of the energy chain. This allows an easy retrofitting of existing energy chains.

The sensor modules are arranged preferably at regular intervals along the longitudinal direction of the energy chain, even in sensor modules on or in the energy chain. The distance is preferably smaller than or equal to the arc length of the deflection arc, in particular smaller than or equal to 1.6 times the radius of the deflection arc, in order to achieve a sufficiently good accuracy of the position detection.

Various of the above preferred features, separately specified for the first and second aspect, can, as shown by data communication, also be combined with the respectively other aspect, but are, however, respectively independently considered to be essential to the invention.

All embodiments are particularly advantageous for energy chains with sliding-off or rolling-off upper strand, in particular for energy chains with approximately horizontal course that are designed for long displacement paths, typically >5 m, in particular >10 m.

Furthermore, most of the proposed monitoring systems, or the proposed arrangements, in particular allow continuous position determination sufficiently precise for the monitoring of an energy chain, in particular of the deflection arc, with respect to the displacement path. A plurality of failures can be detected in a simple manner from an unexpected change in position of the deflection arc.

Systems according to the first and second aspect particularly allow a monitoring of the functioning for the purpose of a safety shutdown.

Third Aspect of the Invention

Inter alia, the third aspect allows the use-dependent prediction of the remaining service life of energy chains and of lines guided in these chains.

According to the independent third aspect of the invention, the third above-mentioned object is already achieved in a system in that at least one sensor module, which is arranged at the end region of the moveable strand, which comprises the second connection point, or also arranged at the driver. In this case, the proposed sensor module has at least one sensor for the quantitative detection of a kinematic parameter, e.g. acceleration, speed and/or position, of the driver-side end region of the moveable strand, as well as a communication unit for the transmission of output data of the sensor, i.e. of data that are based upon sensor outputs dependent on detected kinematic parameters, to an interface and/or evaluation unit, for further data processing.

A prediction of the remaining useful life or service life can already be determined through calculations by the continuous detection of data regarding the dynamic behavior of the energy chain, such as e.g. the number of travelled back- and forth cycles, or more precise data on the actually displaced travel path, e.g. by comparison with empirical data from a, possibly virtual, calculation of the expected useful life. A sensor module as proposed above allows, per se, to equip or retrofit an energy chain with a data logger for the recording of the kinematic operational behavior. The storage does not necessarily have to be implemented in the sensor module, as the data can be transmitted to a superordinate computing unit or evaluation unit by means of the communication unit.

Particularly preferably, an acceleration sensor, in particular a 3-axis acceleration sensor is provided as a sensor for detecting kinematic parameters of the moved chain end. This allows a precise determination of the overall travel path (travelled distance) covered during operation of the driver-side chain end by multiple integration. Thus, precise conclusions on the state of wear are possible in the knowledge of the intended conditions of use. An acceleration sensor can also deliver further wear-relevant data, such as occurring force ratios (pulling/pushing forces) or vibration data from the running operation. In addition, an acceleration sensor inherently allows a reliable detection of sub-paths, since in many applications, the energy chain does not only travel through complete strokes between two end positions.

As an alternative to an acceleration sensor, other sensors are also conceivable, such as path sensors, e.g. incremental sensors, or position sensors such as GPS position measuring devices or the like, which permit a continuous detection of the travel path, or of the current position.

For the processing of the sensor output, a computing unit can be provided in the acceleration sensor, such as e.g. a microprocessor, DSP, ASIC or the like, which delivers treated or already processed measuring data to the communication unit.

To assign the detected data to a specific customer application or to the energy chain in question, the sensor module, in particular the communication unit, may comprise a predefined, e.g. firmly preprogrammed unique identifier, which can be used for an unambiguous identification of the sensor module ("sensor number"). For this purpose, in a simple implementation, the existing unique MAC address which is already used in most protocols for addressing the communication, such as Wi-Fi, ZigBee, CAN bus, or the like, can be used. Thus, the link with application-specific information such as chain type, dimensioning (width, length, etc.), loading weight, etc., which have an influence on the useful life, can occur e.g. by means of a suitable database, or in the computing or evaluation unit.

For the optimization of the useful prediction of service life, it is advantageous if the sensor module comprises at least one further sensor for the quantitative detection of operating parameters and/or environmental parameters. In particular a temperature sensor allows an improvement as ageing models are taken into account. Further operating and/or environmental parameters that can be detected are, for example, occurring vibrations, structure-borne sound, dust, etc. vibration can be detected here by the provided acceleration sensor, or just as well by an additional piezoelectric sensor.

The communication unit can be configured as an integrated circuit for wireless communication with a radio communication interface, e.g. in accordance with Wi-Fi, Bluetooth, ZigBee, or the like, also according to the third aspect, or be configured for communication via a wired bus, such as a CAN bus or another suitable industrial bus or fieldbus, also according to the third aspect.

For the initial installation of existing energy chains, or also for the retrofitting of already installed energy chains, it is advantageous if the sensor module is integrated in a distinct housing, and can be releasably attached by means of a suitable connection on a chain link of the energy chain, in particular on a cross web. Furthermore, other features of the sensor module described further above in accordance with the second aspect can also be employed in the third aspect.

In a development, an evaluation unit or computing unit having an interface to the communication unit(s) is provided, which collects the transmitted data from all existing sensor modules and, as an independent solution, conducts the calculation of the useful life, or forwards the data e.g. to a cloud solution for this purpose.

The third aspect also provides special advantages in energy chains for long displacement paths, which typically are configured with a sliding-off or rolling-off upper strand.

The system according to the third aspect is particularly suitable for the determination of the travelled displacement path for the purpose of the prediction of the service life of the energy chain, so that this chain can already be exchanged before a failure, for example. Furthermore, the system allows collecting application data for the optimization of the prediction models. When reaching a predefined service life, which is calculated from the continuous detection by means of the sensor module, the computing unit or evaluation unit can output a notification.

BRIEF DESCRIPTION OF THE DRAWINGS

Further advantageous features and effects of the invention will hereinafter be explained in more detail by means of some preferred exemplary embodiments with reference to the attached drawings. The Figures show:

FIG. 6A is a first exemplary embodiment of a monitoring system with a plurality of sensor modules distributed lengthwise in the energy chain, which are configured for radio communication, as a schematic in a side view;

FIGS. 6B-6C are possible construction designs of sensor modules as schematic block diagrams;

FIG. 7 is a second exemplary embodiment of a monitoring system with a plurality of sensor modules distributed lengthwise in the energy chain, which are configured for communication via a wired bus, as a schematic in a side view;

DETAILED DESCRIPTION

Figure 1B:
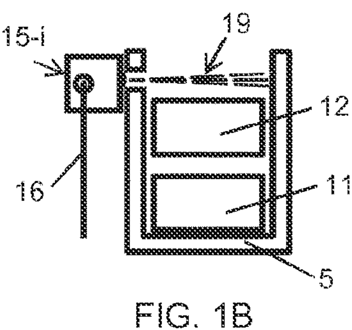
FIGS. 1A-1B are first exemplary embodiments of a monitoring system with stationary sensors along the displacement path with a communication bus in the type of a circuit block diagram.

Like reference characters indicate features of equivalent design or effect throughout the drawings Repetitions are dispensed with for the sake of clarity.

FIGS. 1 to 7 show an energy chain, generally indicated with 1, with a lying stationary strand 11, also called lower strand in a horizontal arrangement, a moveable strand 12, also called upper strand in a horizontal arrangement, as well as with a displaceable, approximately U-shaped deflection arc 13—as a locally-variable transition therebetween—which ensures a predefined curvature radius. A so-called "sliding", i.e. not self-supported energy chain 1 for long displacement paths, typically >3 m, is shown here. In such energy chains 1, the moveable strand 12 can slide-off or roll-off on the stationary strand 11. Skids or rollers, known per se, are not shown. The predefined curvature radius of the deflection arc 13, for the protection of the guided lines (not shown), is significantly larger that the contact distance between the strands 11, 12. However, the invention is generally also suitable for self-supported energy chains or vertical applications (not shown).

The end region of the stationary strand 11 forms a first connection point of the energy chain 1, and is attached to a base which is fixed in space with respect to the surroundings, which base forms the fixed point 2 of the energy chain 10. The end region of the moveable strand 12 forms a second connection point of the energy chain 1 and is attached to a driver 4, which is relatively-moveable to the fixed point 2, namely is connected with the moving part to be supplied, e.g. of an industrial machine or plant.

In a manner known per se, the driver 4 moves, in accordance with the double arrows shown in FIGS. 1 to 7, in a forward and backward direction, and thereby pulls or pushes the energy chain 1. In FIGS. 1 to 7, the driver 4 and thus the position of the energy chain 10, is purely exemplary, shown only for the purpose of illustration as a snapshot or current intermediate position. The energy chain 1 is configured for a practically planar movement along the forward and backwards direction, i.e. with parallelly-remaining strands 11, 12, and essentially consists of chain links (not shown in greater detail), which can be angled relative to one another e.g. about parallel pivot axes pivotable perpendicularly to the plane of FIGS. 1 to 7. The energy chain 1 can be guided laterally in a guide trough 5, which is schematically shown in more detail in FIG. 1B, in all embodiments.

Figure 1A:
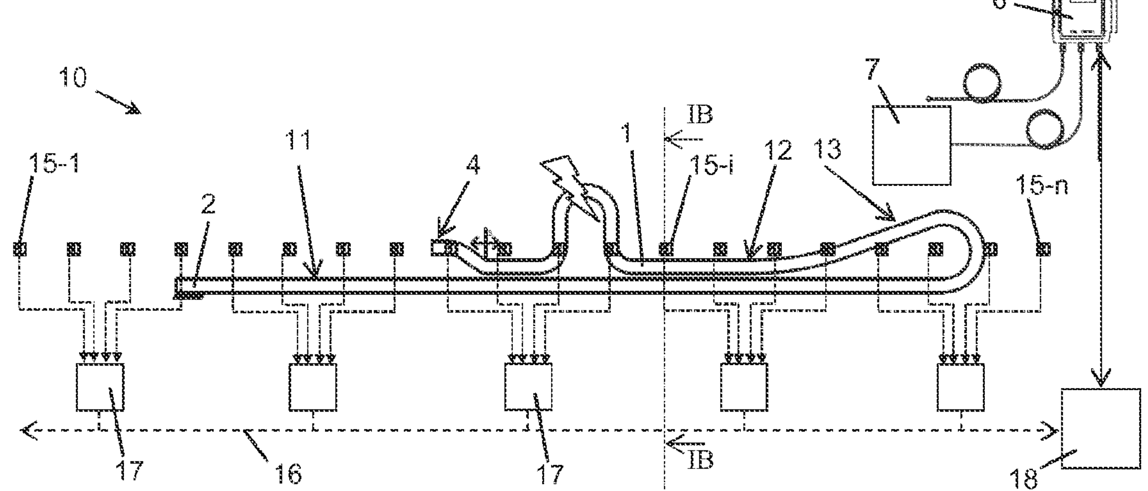
Figure 5:
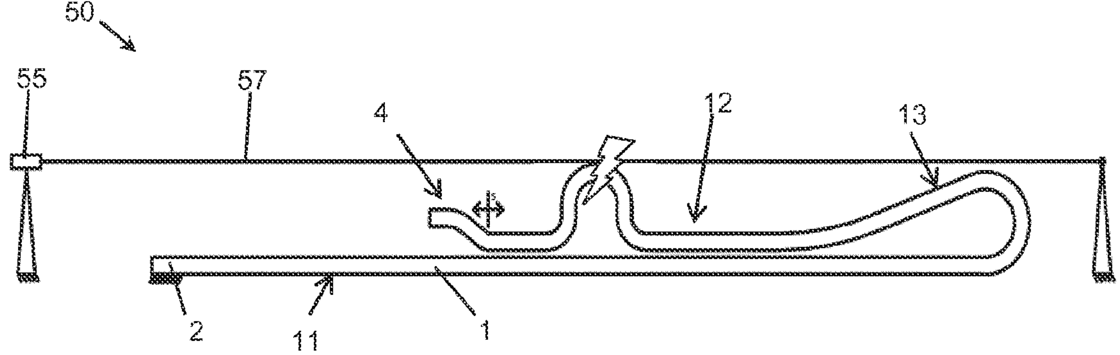
FIG. 5 is a fifth exemplary embodiment of a monitoring system with a stationary sensor and a triggering element along the displacement path, as a schematic in a side view.

A rare but possible error condition (indicated as a "lightning"), especially in long or fast-travelling energy chains 1 is shown, purely schematically and in an exaggerated form, only by FIGS. 1A and 5, wherein a sub-section of the moveable strand 12 is raised in an undesired manner. The remaining figures show a normal course of the energy chain 1.

In the exemplary embodiment according to FIGS. 1A-1B, a monitoring system 10 with a plurality of sensors 15-1 to 15-*n* fixed stationary on the guide trough 5, is provided. The sensors 15-1 to 15-*n* are wired to a bus interface 18 via a fieldbus 16. In order to increase the address space of the bus interface 18, respectively one group of multiple sensors 15-*i* is connected to the fieldbus 16 via a suitable bus coupler 17. The bus interface 18 is connected with an evaluation unit 6, for data communication. In the event of a faulty behavior of the energy chain 1, the evaluation unit 6 outputs a corresponding signal to the control 7 of the machine or plant supplied by the energy chain 1.

In the monitoring system 10 of FIGS. 1A and 1B, contactless optical sensors 15-*i*, e.g. light feelers, are provided. In this case, as can be taken from FIG. 1B, the sensors 15-*i* are arranged in such a way that the beam path 19 is located with a small distance above the nominal course of the moveable strand 12. The beam path 19 runs approximately in a plane perpendicularly to the displacement direction. In this case, the sensors 15-*i* respond respectively in the event that a part of the deflection arc 13 moves through the corresponding beam path 19. The position of the connection end at the driver 4 can also be detected. Furthermore, the corresponding sensors 15-*i* react if a sub-section of the moveable strand 12 abandons the nominal course upwards.

Accordingly, in the exemplary embodiment of FIGS. 1A and 1B, the evaluation unit 6 can recognize where the deflection arc 13 is currently located, and compare it to an expected target position, and/or recognize if the moveable strand 12 breaks out of the target course. The deflection arc 13 should always have a steady position change, and sensors 15-*i* between deflection arc 13 and driver 4 must not trigger.

As the detection path, a plurality of sensors 15-*i* to 15-*n* are attached to the guide trough 5 along the displacement path of the energy chain 1 in a distributed manner. The sensors 15-*i* can be manufactured and delivered together with the guide trough 5, including the fieldbus connections, e.g. with bus couplers 17 and bus interface 18, as the case may be. An exchange of the energy chain 1 is possible without changes to the monitoring system 10. As an alternative to light feelers as sensors 15-*i*, other contactless proximity switches can be used. The uniform spacing between the sensors 15-*i* along the displacement path is preferably selected to fit to the predefined radius in the deflection arc 13, so that its current position can be determined in a sufficiently precise manner.

A proven fieldbus 16 in accordance with industrial standard, e.g. an ASI bus with linear topology, preferably with power supply of the consumers, can be used as a suitable fieldbus 16. Likewise, conceivable is a design with wireless communication between the sensors 15-*i* and the evaluation unit 6, using a suitable interface module instead of the bus interface 18.

Figure 2:
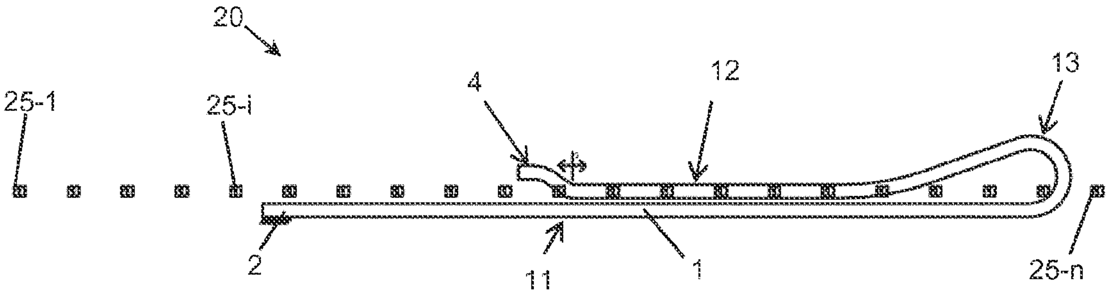
FIG. 2 is a second exemplary embodiment of a monitoring system with stationary sensors along the displacement path, as a schematic in a side view.

The example of FIG. 2 essentially corresponds to the preceding one. The monitoring system 20 differs mainly in that the plurality of stationary sensors 25-1 . . . 25-*n* are arranged at the height of the nominal course of the moveable strand 12, when this strand slides-off or rolls-off on the stationery strand 11. As a result, the evaluation unit 6 can monitor the nominal course of the moveable strand 12 and compare it, for example, with a previously taught target course. The current position of the deflection arc 13 can be detected and monitored due to the free space in the deflection arc 13, in this exemplary embodiment as well.

Figure 3:
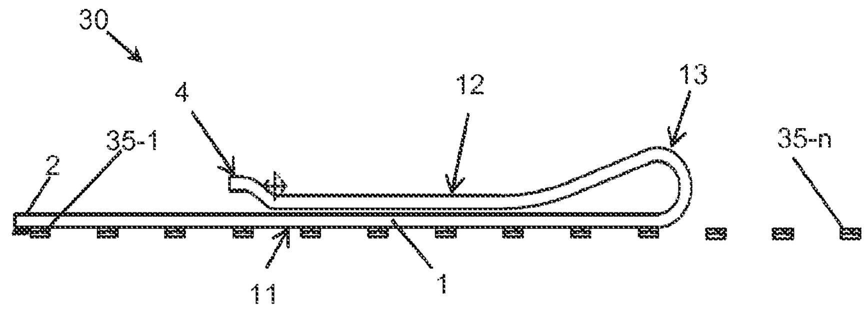
FIG. 3 is a third exemplary embodiment of a monitoring system with stationary sensors along the displacement path, as a schematic in a side view.

The exemplary embodiment of FIG. 3 differs in that the sensors 35-*i* of the monitoring system 30 are located opposite the cross-webs of stationary strand 11, e.g. by attachment to the lower side of the guide trough 5 (see FIG. 1B). Together with information about the current position of the driver 4, for example from the plant control 7, the monitoring system 6 can check the desired course of the moveable strand 12 and/or the deflection arc 13 based upon the output of the sensors 35-*i*.

Figure 4:
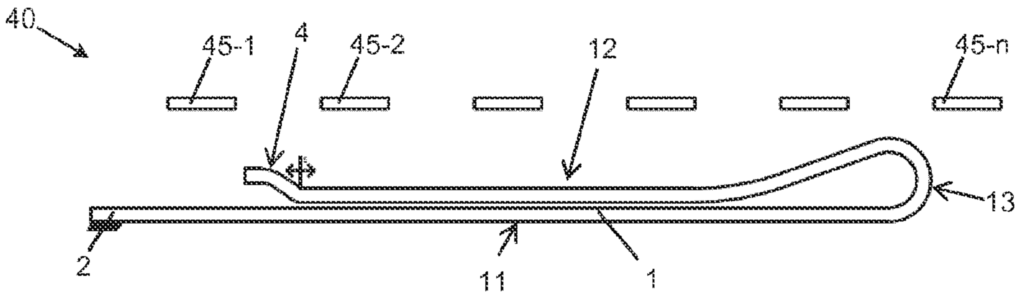
FIG. 4 is a fourth exemplary embodiment of a monitoring system with stationary sensors along the displacement path, as a schematic in a side view.

In a further exemplary embodiment of FIG. 4, a smaller number of sensors 45-*i* to 45-*n* is arranged at a larger distance above the deflection arc 13 along the displacement path. The sensors 45-1 to 45-*n* can be configured as metal detectors, capacitive proximity detectors, or the like, for example. Here, the evaluation unit 6 can compare a vector of analog signal values of the sensors 45-1 to 45-*n* with a target vector. In the event of an unexpected leap in a vector component beyond a threshold value, the evaluation unit 6 can conclude a faulty behavior of the energy chain 1.

In the above exemplary embodiments, the distribution of the sensors 15-*i* . . . 45-*i* along the displacement path forms a detection path. Each of the sensors 15-*i* . . . 45*i* reacts individually and locally to an approaching of the energy chain 1. A mechanical actuation by contact, e.g. a switch contact, is also conceivable, but more prone to wear.

Another, simplified exemplary embodiment of a monitoring system 50 is shown in FIG. 5. This system merely has one electromechanics sensor 55, which has an elongate triggering element 57. The triggering element 57 extends along the displacement path of the moveable strand 12. The triggering element 57 can be configured as a triggering cord, similar to a trip wire. The triggering element 57 is arranged above the nominal course of the moveable strand 12 opposite the same, and forms the detection path itself. In the event that a partial section of the moveable strand 12 contacts the triggering element 57, the sensor 55 is triggered and signals it to the evaluation unit 6, which thereby concludes a faulty behavior. In analogy to FIG. 5, a light barrier (not shown) oriented in parallel to the movement direction, can form the detection path and react in a contactless manner.

Exemplary embodiments according to the second aspect of the invention are explained in an exemplary manner in the following based on FIGS. 6-7. In the monitoring system 60 according to FIG. 6, a plurality of sensor modules 65-1 to 65-*n* are distributed across the longitude in the energy chain 1. The sensor modules 65-1 to 65-*n* accompany the energy chain 1. Thus, they can locally detect, with regard to a certain longitudinal section of the energy chain 1 and using an integrated measurand detector, a state variable, in particular a kinematic parameter, of the energy chain 1 and continuously communicate said value to the evaluation unit 6. To that end, each sensor module 65-1 to 65-*n* according to FIGS. 6B-6C comprises a suitable communication unit 65B, which is preferably integrated in each sensor module 65-*i*.

In the example according to FIG. 6, the communication unit 65B is configured for wireless data transmission via Wi-Fi. 3-axis acceleration sensors known per se are in particular considered as measurand detectors 65A. These allow for the quantitative detection of a kinematic parameter concerning a local region, e.g. a chain link of the energy chain 1, on which the respective sensor module 65-I is fastened.

As an alternative or in addition, also position sensors for the detection of the spatial orientation and/or height sensors are considered as measurand detectors 65A. All sensor modules 65-*i* continuously transmit output values to the evaluation unit 6, for example in a clocked manner with sufficiently high clock frequency. The evaluation unit 6 is connected to the communication units 65B via a suitable radio interface 68, for the purpose of data transmission. In order to avoid the incorrect recording of an error, a time average, i.e. a moving average or the like can, in this example as well, be formed via the output values of each sensor module 65-*i*, in order to check for abrupt changes.

A plurality of sensor modules 65-*i* with measurand detectors 65A for the metrological detection of a state variable permits a precise knowledge about the current state of the energy chain 1 in ongoing operation. Said variable can continuously be compared to predefined nominal values by the evaluation unit 6, in order to identify an error state at an early stage upon a critical discrepancy.

FIGS. 6B and 6C illustrate two possible exemplary embodiments for sensor modules 65-*i*. In this case, an integrated circuit or an IC 651 can comprise both the measurand detector 65A as well as the communication unit 65B as functional units. Where appropriate, further auxiliary circuits 65C, e.g. for energy supply from an energy store (not shown), signal treatment and the like can be implemented in this IC 651. According to FIG. 6C, an integrated circuit 652 is configured, with the measurand detector 65A and possibly auxiliary circuits 65C, separately from an IC, which forms the communication unit 65B.

Alternatively, to the communication via radio, also a higher-level wired communication is also conceivable, e.g. via an industrial bus or fieldbus adapted to higher data dates. FIG. 7 shows a corresponding monitoring system 70, wherein the sensor modules 75-1 to 75-*n* are connected to a bus interface 78 via a wired fieldbus 76. The fieldbus 76 is preferably implemented so as to have line topology in serial two-wire technology, which minimizes the cabling effort within the energy chain 1. Aside from the data transmission, also the power supply of the sensor modules 75-1 can here also occur via lines of the fieldbus 76, for example in a manner similar to FIG. 1.

Here, the data transmission of quantitative measurands from the individual sensor modules 75-*i* to the evaluation unit 6 using the bus interface 78, e.g. similar to FIG. 1.

Below, FIG. 8 explains an exemplary embodiment according to the third aspect of the invention in an exemplary manner.

Figure 8:
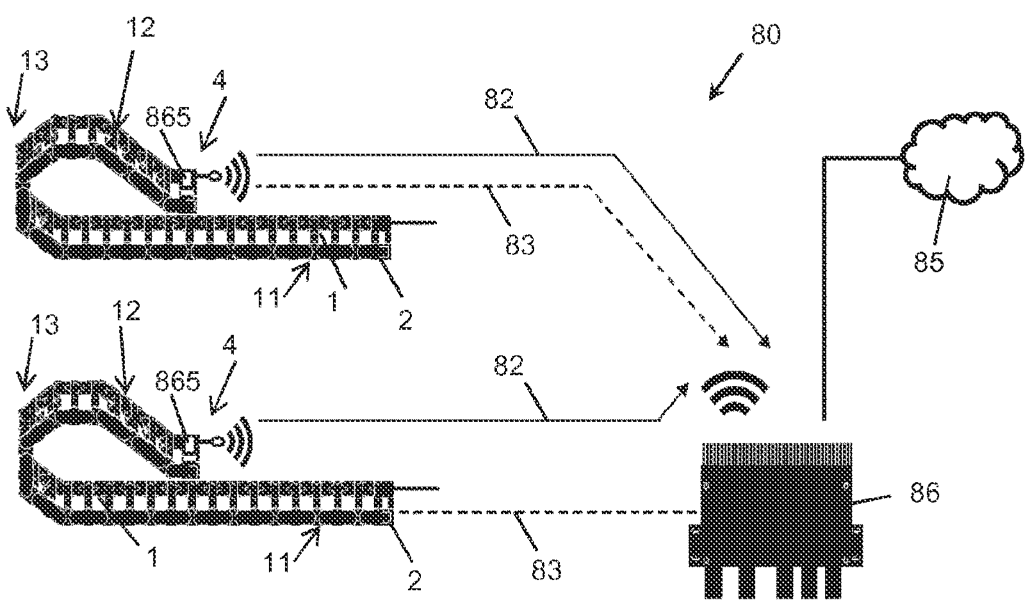
FIG. 8 is an exemplary embodiment of the system according to the third aspect, with multiple energy chains respectively comprising one driver-side sensor module that communicates with an evaluation unit, as a schematic in a side view.

According to FIG. 8, in each case merely one sensor module 865, for example a module with the structure according to FIG. 6, is arranged on the energy chain 1, close to the driver 4. The sensor modules 865 are e.g. releasably fastened to the end fastening element of the movable strand 12.

As intended, the energy chains 1 are configured having a sliding upper strand 12. Other features of the energy chain 1 corresponded to those described above.

The features of the sensor module 865 correspond to those as disclosed with reference to FIG. 6 above, for example. Each sensor module 865 has at least one sensor 65A (FIG. 6), which continuously detects a current movement parameter of the end region of the movable strand 12 driven by the driver 4. A 3-axis acceleration sensor in particular can be used as the sensor 65A. Also other sensors, for the detection of path distance, speeds and/or acceleration, or a combination thereof, as potential kinematic parameters with respect to the driver-side end of the energy chain 1 are possible, too.

In addition, each sensor module 865 has a suitable communication unit 65B (FIG. 6) for transmitting collected and, if necessary, processed output data depending on detected kinematic parameters to an interface of the evaluation unit 86. The communication of the data to the computational evaluation unit 86 can occur via a radio channel 82, for example according to Wi-Fi, ZigBee or another suitable protocol, e.g. at periodic intervals. Here, each communication unit 65B has a unique, predefined address, which address can be used as the identifier of the sensor module 865. With this, the evaluation unit 86 assigns the captured data to a certain energy chain 1, e.g. using an appropriate table or database.

Alternatively, the communication can also occur in a wired manner, e.g. via an addressable CAN bus 83 or the like, which at the same time supplies energy to the sensor modules 865.

The data output of the sensor modules 865 allows for the evaluation unit 86 to autonomously detect the motion behavior of the energy chains 1. Alternatively, the system 80, as necessary, enables a higher-level software, e.g. a cloud application 85, to which the evaluation unit 86 is connected, for example via Internet, to determine the actually covered displacement path for the purpose of predicting the service life. With the use of a cloud application 85, a collection of data for model optimization is, for example, also possible.

The system 80 thusly allows, among other things, targetedly, the utilizable, remaining service life of individual energy chains 1 to be predicted continuously, due to the hitherto use-dependent, application and operation-specific motion behavior of the respective energy chain 1.

Figure 9:
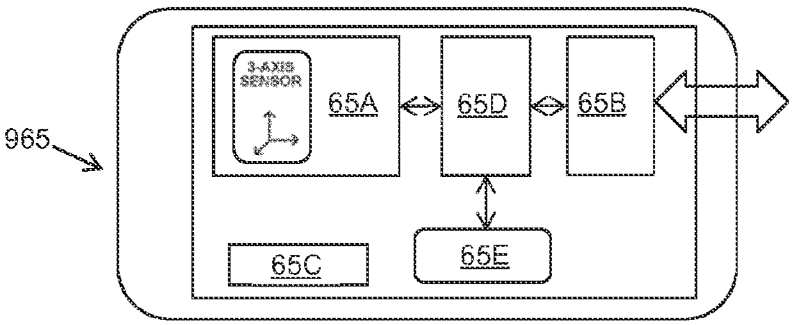
FIG. 9 is a further construction design of a sensor module as a schematic block diagram.

FIG. 9 shows a further development of a sensor module 965, which comprises an acceleration sensor 65A and a communication unit 65B, for example according to FIG. 6. In addition, a sensor 65E is provided for the quantitative detection of operating and/or environmental parameters, for example a temperature sensor. In order to process the output signals of the sensors 65A, 65E, a computing unit 65D, e.g. a microprocessor or a DSP is provided, which continuously digitally processes and treats the outputs, e.g. inter alia smoothens acceleration measurement and averages temperature values. The computing unit 65D generates output data from these data and supplies them, for forwarding, to the communication unit 65B. In the sensor module 965, as well, all components 65A . . . 65E can be implemented in part separated or integrated, e.g. in the form of integrated circuits, for example as a fully-integrated ASIC solution. Further measurement data of the second sensor 65E enable the evaluation unit 86, or a cloud application 85 to make better predictions on the remaining service life or an extensive model optimization.

LIST OF REFERENCE CHARACTERS

FIG. 1-6
1 energy chain
2 fixed point
4 driver
5 guide trough
6 evaluation unit
7 control
11 stationary strand
12 moveable strand
13 deflection arc
FIG. 1A-1B
10 monitoring system
15-1 . . . 15-*n* sensor
16 fieldbus
17 bus coupler
18 bus interface
19 beam path
FIG. 2-4
20; 30; 40 monitoring system
25-1 . . . 25-*n*; 35-1 . . . 35-*n*; 45-1 . . . 45-*n* sensor
FIG. 5
50 monitoring system
55 sensor
57 triggering element
FIG. 6A-6C
60 monitoring system
65-1 bis 65-*n* sensor modules
65A measurand detector
65B communication unit
65C auxiliary circuits
651; 652 integrated circuit
68 radio communication interface
FIG. 7
70 monitoring system
75-1 to 75-*n* sensor modules
76 fieldbus
78 Bus interface
FIG. 8
1 energy chain 2 fixed point
4 driver
11, 12 strands
13 deflection arc
80 monitoring system
82 radio channel
83 CAN bus
85 Cloud application
86 evaluation unit
865 sensor module
FIG. 9
965 sensor module
65A acceleration sensor
65B communication unit
65C auxiliary circuits
65D computing unit
65E temperature sensor
68 radio communication interface

What is claimed is:

1. A monitoring system for monitoring an energy chain condition comprising:

an energy chain for guiding at least one line between a first connection point, for connection to a base, and a second connection point, relatively moveable thereto, for connection to a driver, wherein the energy chain is displaceable along a displacement path while forming a moveable strand, a stationary strand and a deflection arc therebetween;

at least one sensor module, which is arranged at an end region of the moveable strand that has the second connection point or arranged at the driver;

wherein the at least one senor module includes a sensor for quantitative detection of a kinematic parameter of the end region, and a communication unit for the transmission of output data dependent upon detected kinematic parameters, to an interface or an evaluation unit.

2. The monitoring system according to claim 1, wherein the sensor for the quantitative detection of a kinematic parameter is an acceleration sensor.

3. The monitoring system according to claim 1, wherein the sensor module comprises a unique identifier, which is useable for an identification of the at least one sensor module.

4. The monitoring system according to claim 1, wherein the at least one sensor module includes at least one further sensor for quantitative detection of at least one operating parameter and/or at least one environmental parameter.

5. The monitoring system according to claim 4, wherein the at least one further sensor is a temperature sensor.

6. The monitoring system according claim 1, wherein the communication unit is configured as an integrated circuit for wireless communication.

7. The monitoring system according to claim 1, wherein the communication unit is configured as an integrated circuit for wired communication via a wired bus.

8. The monitoring system according to claim 1, wherein the sensor module is releasably attached to a chain element of the energy chain.

9. The monitoring system according to claim 1, wherein the energy chain is configured with a sliding-off upper strand or a rolling-off upper strand.

10. The monitoring system according to claim 1, wherein the monitoring system is configured for determination of a travelled displacement path of the energy chain for predicting service life of the energy chain and/or monitoring of the energy chain.

11. A chain link for an energy chain for guiding at least one line between a first connection point, for connection to a base, and a second connection point, relatively moveable thereto, for connection to a driver, wherein the energy chain is displaceable along a displacement path while forming a moveable strand, a stationary strand and a deflection arc therebetween, wherein the chain link comprises at least one sensor module comprising:

an acceleration sensor for quantitative detection of a kinematic parameter of the chain link, wherein the detected kinematic parameter is acceleration of the chain link; and a communication unit for transmission of output data dependent upon detected kinematic parameters to an interface or an evaluation unit;

wherein the sensor module is releasably attached to the chain link or is integrated in a cross-web or a separation web releasably attached to the chain link.

12. The chain link according to claim 11, wherein the communication unit is implemented in an integrated circuit and is configured for wireless data communication via radio, or for wired data communication via a data bus.

13. The chain link according to claim 11, wherein the at least one sensor module includes at least one further sensor for the quantitative detection of operating and/or environmental parameters.

14. The chain link according to claim 13, wherein the at least one further sensor is a temperature sensor.

15. The chain link according to claim 11, wherein the at least one sensor module comprises an energy storage.

16. The chain link according to claim 11, wherein the at least one sensor module comprises a circuit for the contactless inductive energy transmission.

17. A chain link for an energy chain for guiding at least one line between a first connection point, for connection to a base, and a second connection point, relatively moveable thereto, for connection to a driver, wherein the energy chain is displaceable along a displacement path while forming a moveable strand, a stationary strand and a deflection arc therebetween, wherein the chain link comprises at least one sensor module comprising:

an acceleration sensor for quantitative detection of a kinematic parameter of the chain link; and a communication unit for transmission of output data dependent upon detected kinematic parameters to an interface or an evaluation unit;

wherein the sensor module is releasably attached to the chain link or is integrated in a cross-web or a separation web releasably attached to the chain link;

wherein the at least one sensor module comprises a circuit for the contactless inductive energy transmission.

* * * * *